United States Patent
Tamaoki (10) Patent No.: US 9,567,868 B2
(45) Date of Patent: Feb. 14, 2017

(54) STEAM TURBINE CONTROL DEVICE (71) Applicant: KABUSHIKI KAISHA TOSHIBA, Minato-ku (JP)

(72) Inventor: Tomoharu Tamaoki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 401 days.

(21) Appl. No.: 14/332,928

(22) Filed: Jul. 16, 2014

(65) Prior Publication Data
US 2014/0328673 A1     Nov. 6, 2014

Related U.S. Application Data (63) Continuation of application No. PCT/JP2013/000149, filed on Jan. 16, 2013.

(30) Foreign Application Priority Data

Jan. 17, 2012 (JP) ................. 2012-006852

(51) Int. Cl.
*F01D 17/00* (2006.01)
*F01D 17/18* (2006.01)
(Continued)

(52) U.S. Cl.
CPC ............ *F01D 17/18* (2013.01); *F01K 13/02* (2013.01); *F02C 9/20* (2013.01); *F05D 2220/31* (2013.01); *F05D 2270/44* (2013.01)

(58) Field of Classification Search
CPC ........ F01D 17/105; F01D 17/145; F02C 9/18; F02C 9/20; F05D 2260/606; F05D 2270/3061
See application file for complete search history.

(56) References Cited

U.S. PATENT DOCUMENTS 4,118,935 A * 10/1978 Andersson ................ F01K 7/20
290/40 R
8,505,299 B2 * 8/2013 Mundra ................. F01D 17/18
415/116
(Continued)

FOREIGN PATENT DOCUMENTS

DE    10 2009 026 053 A1    1/2010
EP      2 299 068 A1         3/2011
(Continued)

OTHER PUBLICATIONS

Extended European Search Report issued Nov. 10, 2015 in Patent Application No. 13738360.0.
(Continued)

*Primary Examiner* — Ninh H Nguyen
(74) *Attorney, Agent, or Firm* — Oblon, McClelland, Maier & Neustadt, L.L.P.

(57) ABSTRACT

A steam turbine control device has first and second valves, first and second valve controllers, and a valve control adjuster. The first valve is provided in a first steam supply path connected to a steam turbine. The second valve is provided in a second steam supply path connected to a lower-pressure side of the steam turbine while bypassing the first valve from on the first steam supply path. The first valve controller controls an opening degree of the first valve based on flow rate information A designating a flow rate of steam to be sent to the steam turbine. The second valve controller controls an opening degree of the second valve based on the flow rate information A. The valve control adjuster adds adjustment to control of the opening degree of the second valve by the second valve controller.

7 Claims, 10 Drawing Sheets

(51) Int. Cl.
*F02C 9/20* (2006.01)
*F01K 13/02* (2006.01)

(56) References Cited

U.S. PATENT DOCUMENTS

| | | | |
|---|---|---|---|
| 8,739,509 B2 * | 6/2014 | Asanaka | F01K 13/02 60/39.182 |
| 2010/0000216 A1 | 1/2010 | Hofer et al. | |
| 2012/0174584 A1 * | 7/2012 | Bennauer | F01K 7/22 60/657 |

FOREIGN PATENT DOCUMENTS

| | | |
|---|---|---|
| FR | 2 933 444 A1 | 1/2010 |
| JP | 59-158301 A | 9/1984 |
| JP | 60-108504 A | 6/1985 |
| JP | 6-2504 A | 1/1994 |
| JP | 6-37844 B2 | 5/1994 |
| JP | 10-8912 A | 1/1998 |
| JP | 2005-189016 A | 7/2005 |
| JP | 2006-161698 A | 6/2006 |
| JP | 2010-14114 A | 1/2010 |
| JP | 2010-242673 A | 10/2010 |
| RU | 2009 125 118 A | 1/2011 |

OTHER PUBLICATIONS

International Search Report issued on Apr. 2, 2013 for PCT/JP2013/000149 filed on Jan. 16, 2013 with English Translation.
International Written Opinion mailed on Apr. 2, 2013 for PCT/JP2013/000149 filed on Jan. 16, 2013.
International Preliminary Report on Patentability and Written Opinion issued Jul. 31, 2014 in PCT/JP2013/000149 (submitting English translation only).

* cited by examiner

STEAM TURBINE CONTROL DEVICE

CROSS-REFERENCE TO RELATED APPLICATIONS

This application is a continuation of prior International Application No. PCT/JP2013/000149 filed on Jan. 16, 2013, which is based upon and claims the benefit of priority from Japanese Patent Application No. 2012-006852 filed on Jan. 17, 2012; the entire contents of all of which are incorporated herein by reference.

FIELD

Embodiments described herein relate generally to a steam turbine control device.

BACKGROUND

A steam turbine power generating system is designed so that a linearity is maintained as a characteristic in a relation between an opening degree of a steam control valve provided in a main steam pipe which sends steam to a steam turbine and a flow rate of steam passing through the steam control valve.

However, in practice, directly before the opening degree of the steam control valve is made fully opened, it becomes difficult to make a supply amount of steam follow an increased amount of the opening degree of the steam control valve. Such a phenomenon is caused by a fact that an opening size of a flow path inside a pipe connected to a downstream side of the steam control valve becomes comparatively smaller than an opening size of a flow path inside the valve when the steam control valve is being opened.

Thus, a technique is suggested in which a bypass pipe provided with a steam overload valve is disposed, in consideration of an operation at a time of overload of a steam turbine. Such a bypass pipe is connected to a lower-pressure side of the steam turbine than a main steam pipe, while bypassing a steam control valve from on a main steam pipe, for example.

However, supplying steam from a bypass pipe to a low-pressure side of a steam turbine means decrease of a workload performed by steam to the steam turbine for a range from a steam discharge port of a main steam pipe to a steam discharge port of a bypass pipe, compared with a case where steam is supplied from the main steam pipe. Therefore, in order to operate the steam turbine efficiently, it is important to properly control action of a steam overload valve on the bypass pipe.

DETAILED DESCRIPTION

A steam turbine control device of an embodiment has a first valve, a second valve, a first valve control unit, a second valve control unit, and a valve control adjustment unit. The first valve is provided in a first steam supply path connected to a steam turbine. The second valve is provided in a second steam supply path connected to a lower-pressure side of the steam turbine than the first steam supply path while bypassing the first valve from on the first steam supply path. The first valve control unit controls an opening degree of the first valve based on flow rate information designating a flow rate of steam to be sent to the steam turbine. The second valve control unit controls an opening degree of the second valve based on the flow rate information. The valve control adjustment unit adds adjustment to control of the opening degree of the second valve by the second valve control unit.

Hereinafter, embodiments will be described based on the drawings.

First Embodiment

Figure 1:
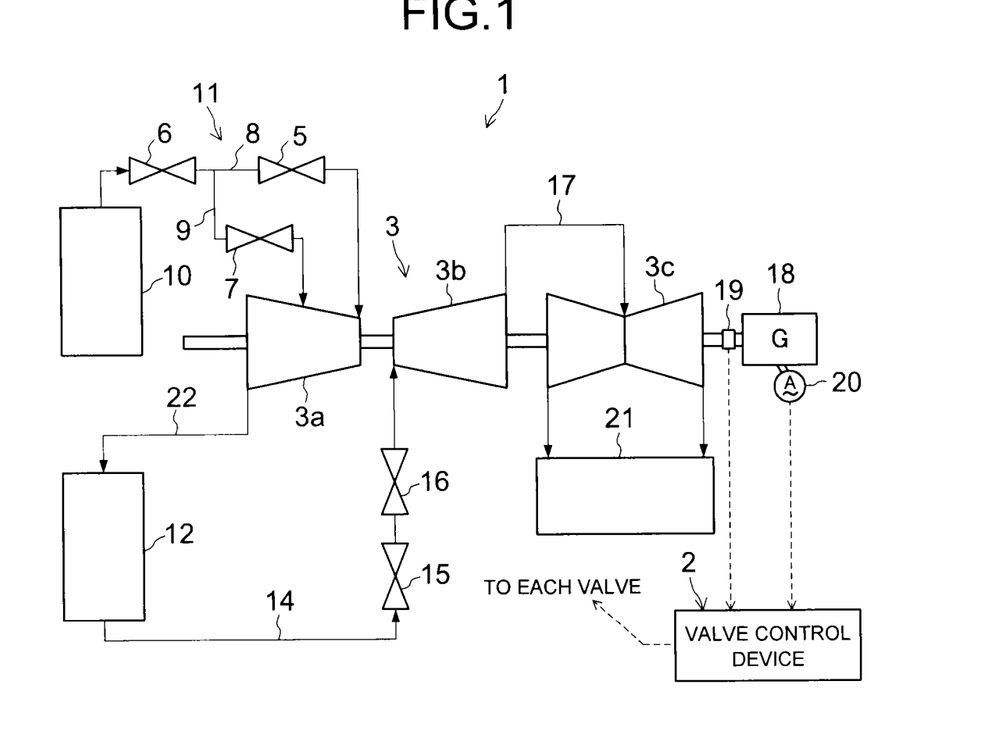
FIG. 1 is a system diagram showing a configuration of a steam turbine power generating system which includes a steam turbine control device according to a first embodiment.

As shown in FIG. 1, a steam turbine power generating system 1 which includes a steam turbine control device 11 of the present embodiment mainly has a boiler 10, a main steam pipe 8 functioning as a first steam supply path, a bypass pipe 9 functioning as a second steam supply path, a steam turbine 3, a steam reheat transfer pipe 22, a reheater 12, a reheat steam supply pipe 14, a steam resupply pipe 17, and a steam condenser 21.

Besides, the steam turbine power generating system 1 further has a rotation rate detector 19, a power generator 18, and a current detector 20. The steam turbine 3 has a high-pressure turbine 3a, an intermediate-pressure turbine 3b, and a low-pressure turbine 3c.

As shown in FIG. 1, the boiler 10 heats water sent from the steam condenser 21, for example, to generate steam (main steam) to be supplied to the steam turbine 3. The main steam pipe 8 is a pipe connecting the boiler 10 and the high-pressure turbine 3a. The main steam pipe 8 constitutes a flow path which supplies steam generated in the boiler 10 to a high-pressure side of the high-pressure turbine 3a.

The main steam pipe 8 branches into four, for example, before connection to the high pressure side of the high-pressure turbine 3a. End portions (steam discharge ports) of the four-branching main steam pipe 8 are each disposed in a direction surrounding the high-pressure side of the high-pressure turbine 3a, at a predetermined interval. Further, the end portions of the four-branching main steam pipe 8 discharge (intake) steam from positions different from each other in the high-pressure side of the high-pressure turbine 3a.

As shown in FIG. 1, the bypass pipe 9 is a pipe bypassing a later-described steam control valve 5 from on the main steam pipe 8 and connected to a lower-pressure side of the high-pressure turbine 3a than the main steam pipe 8 (than a position at which the main steam pipe 8 is connected to the high-pressure turbine 3a). The bypass pipe 9 is used mainly at a time of overload of the steam turbine 3. The bypass pipe 9 constitutes a flow path which supplies steam inside the main steam pipe 8 to an intermediate-pressure portion of the high-pressure turbine 3a.

The steam reheat transfer pipe 22 transfers the steam discharged from a low-pressure side of the high-pressure turbine 3a to the reheater 12. The reheater 12 reheats the steam sent from the steam reheat transfer pipe 22. The reheat steam supply pipe 14 supplies the reheated steam to a high-pressure side of the intermediate-pressure turbine 3b. The steam resupply pipe 17 supplies the steam discharged from a low-pressure side of the intermediate-pressure turbine 3b to a high-pressure side of the low-pressure turbine 3c. The steam condenser 21 is what is called a condenser. The steam condenser 21 cools and condenses the steam discharged from a low-pressure side of the low-pressure turbine 3c to make the steam return to a saturated liquid (water).

As shown in FIG. 1, the power generator 18 generates electric power by receiving a driving force from a rotary shaft provided in an axis center of the steam turbine 3. The rotation rate detector 19 detects an actual rotation rate (actual system frequency) per a unit time of the steam turbine 3. The current detector 20 detects a value of a current flowing to the power generator 18. The current value flowing in the power generator 18 and a load applied to the power generator 18 are in a proportionality relation. Thus, the current detector 20 is used for detection of an actual load applied to the power generator 18 and the steam turbine 3.

Figure 2:
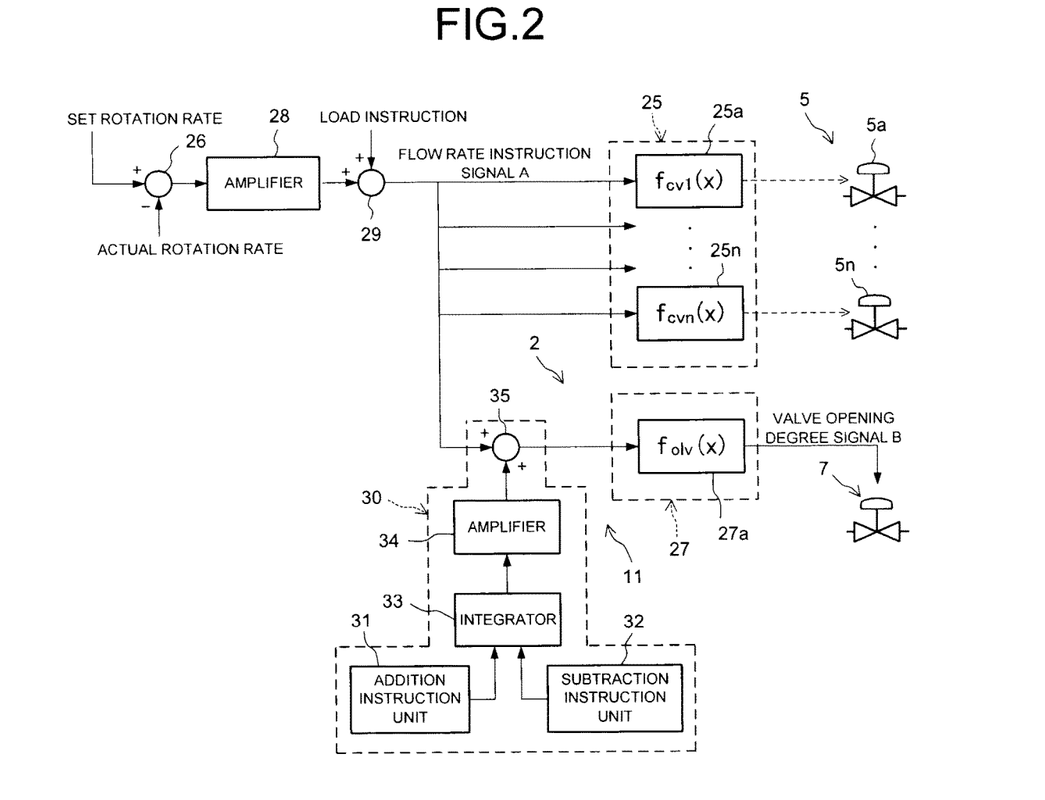
FIG. 2 is a functional block diagram showing a configuration of the steam turbine control device of FIG. 1.

Further, as shown in FIG. 1 and FIG. 2, the steam turbine control device 11 has a steam stop valve 6, the steam control valve 5 (5a . . . 5n) as a first valve, a steam overload valve 7 being a second valve, a re-steam stop valve 15, an intercept valve 16, and a valve control device 2 controlling operations of those valves. In addition to the above, the steam turbine control device 11 has a subtracter 26, an amplifier 28, and an adder 29. The subtracter 26, the amplifier 28, and the adder 29 are used for control to adjust a speed of the steam turbine 3 to a constant rotation speed (set rotation rate).

As shown in FIG. 2, the subtracter 26 obtains an actual rotation rate per a unit time of the steam turbine 3 detected by the rotation rate detector 19. On the other hand, the subtracter 26 obtains a target set rotation rate having been set in advance, in the steam turbine 3, from a set rotation rate outputter (not shown). Further, the subtracter 26 outputs a rotation rate deviation signal obtained by subtracting the actual rotation rate from the obtained set rotation rate, to the amplifier 28.

The amplifier 28 multiplies the accepted rotation rate deviation signal by an inverse number of a steady state speed variation and outputs a rotation rate deviation signal amplified thereby to the adder 29. Here, the steady state speed variation means a ratio indicating how much a stationary rotation rate of the steam turbine 3 changes when a stationary load of the steam turbine 3 is changed (without changing setting of a regulator). In general, a value of 5% or 4% is applied to a steady state speed variation. Therefore, a value of "20" or "25", for example, is set as the steady state speed variation. Therefore, a value such as "20" or "25", for example, is set as the inverse number of the steady state speed variation in the amplifier 28. This value (gain) set in the amplifier 28 is multiplied by the rotation rate deviation signal.

The adder 29 accepts the rotation rate deviation signal amplified by the amplifier 28. On the other hand, the adder 29 accepts a load instruction signal (load instruction). The load instruction signal is a signal indicating a value corresponding to a target load of the steam turbine 3 set (planned) in correspondence with a demand of electric power. Further, as shown in FIG. 2, the adder 29 outputs a flow rate instruction signal A obtained by adding the amplified rotation rate deviation signal and the above-described load instruction signal to a valve control device 2 side. The flow rate instruction signal A is flow rate information for designating a flow rate of steam to be sent from the boiler 10 to the steam turbine 3.

As shown in FIG. 1, the steam stop valve 6 is provided on the main steam pipe 8, and is disposed in an upper-stream side than the position at which the bypass pipe 9 bypasses (branches) from on the main steam pipe 8. The steam stop valve 6 is a valve functioning as a source-cook capable of preventing flow of steam to a steam turbine 3 (high-pressure turbine 3a) side. The steam control valve 5 (5a . . . 5n) is provided on the main steam pipe 8. The steam control valve 5 is disposed in a lower-stream side than the position at which the bypass pipe 9 bypasses from on the main steam pipe 8. More specifically, the steam control valves 5a . . . 5n are each installed on the four pipes branching from the main steam pipe 8 main body before the high-pressure turbine 3a.

The steam overload valve 7 is disposed on the bypass pipe 9. Further, the re-steam stop valve 15 is provided on the reheat steam supply pipe 14. The re-steam stop valve 15 is a valve capable of preventing flow of steam to an intermediate-pressure turbine 3b side. The intercept valve 16 is provided on the reheat steam supply pipe 14. The intercept valve 16 is disposed in a lower-stream side than a position of the re-steam stop valve 15. Opening/closing operations of the re-steam stop valve 15 and the steam stop valve 6 are controlled by the valve control device 2. Further, with regard to the intercept valve 16, its opening degree is controlled via the valve control device 2 based on the flow rate instruction signal A, for example.

Next, control of opening degrees of the steam control valve 5 and the steam overload valve 7 will be described. The valve control device 2 which the steam turbine control device 11 of the present embodiment has, as shown in FIG. 2, further has a valve control unit 25 as a first valve control unit, a valve control unit 27 being a second valve control unit, and a valve control adjustment unit 30. Note that, to the aforementioned steam control valve 5 (5a . . . 5n) and steam overload valve 7, lift-type check valves which heighten opening degrees by lifting (holding up) valve main bodies thereinside are applied.

The valve control unit 25 controls the opening degree of the steam control valve 5 based on the flow rate instruction signal A being flow rate information. In detail, the valve control unit 25 has a plurality of function generators 25a . . . 25n for individually controlling the opening degrees of the aforementioned steam control valves 5a . . . 5n. The individual function generators 25a . . . 25n each accept the flow rate instruction signal A being a variable indicating a value corresponding to a flow rate of steam (which is designated as flow rate information) as the above-descried flow rate information.

Further, the individual function generators $25a \ldots 25n$ each output valve opening degree signals indicating values corresponding to the opening degrees of the steam control valves $5a \ldots 5n$, respectively, as functions of the accepted flow rate instruction signal A, to steam control valves $5a \ldots 5n$ sides. Note that the functions (functional formulas) which the function generators $25a \ldots 25n$ each have can be the same or can be specific functions (functional formulas) for the steam control valves $5a \ldots 5n$.

On the other hand, the valve control unit 27 controls, as shown in FIG. 2, the opening degree of the steam overload valve 7 based on the above-described flow rate information (flow rate instruction signal A). The valve control unit 27 has a function generator 27a functioning as the first function generator. The function generator 27a has a function (functional formula) different from those of the function generators $25a \ldots 25n$. Concretely, the function generator 27a accepts the flow rate instruction signal A as a variable. Further, the function generator 27a outputs a valve opening degree signal B indicating a value corresponding to an opening degree of the steam overload valve 7 as a function of the accepted flow rate instruction signal A, to a steam overload valve 7 side.

Figure 3:
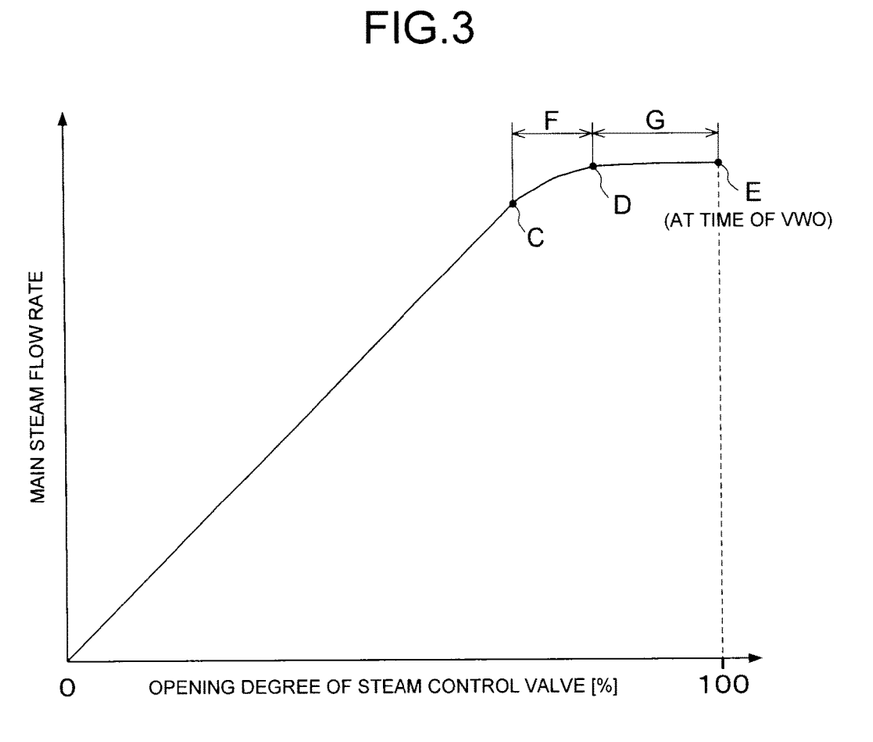
FIG. 3 is a graph showing a relation between an opening degree of a steam control valve and a main steam flow rate.

FIG. 3 indicates a relation between an opening degree of the steam control valve 5 provided in the main steam pipe 8 and a main steam flow rate (flow rate of steam passing inside the steam control valve 5 on the main steam pipe 8). It is desirable that the relation between the opening degree of the steam control valve 5 and the main steam flow rate is designed to maintain a linearity as an ideal characteristic. Here, "E" in FIG. 3 indicates a point at which the opening degree of the steam control valve 5 becomes fully opened (VWO: Valve Wide Open).

Further, "C" indicates a breaking point where the above-described linearity can be maintained. Further, "D" is a point where an opening size of a flow path inside the pipe (main steam pipe 8) connected to the downstream side of the steam control valve 5 becomes relatively smaller than an opening size of the flow path inside the valve when the steam control valve 5 is gradually opened, due to a structure of the main steam pipe 8. In other words, a zone F between the point C and the point D is a range in which the above-described linearity cannot be maintained because of characteristics. Further, a zone G between the point D and the point E is a range in which the main steam flow rate is narrowed (range in which rise of the flow rate is hardly obtained) due to a magnitude relation of the above-described opening sizes.

In short, just before the opening degree of the steam control valve 5 is made fully opened, it become difficult to make a supply amount of steam follow an increased amount of the opening degree of the steam control valve 5. Further, one of the reasons why it is difficult to supply steam from the main steam pipe 8 in which the steam control valve 5 is installed to the inside of the steam turbine 3 is that the steam discharge port of the main steam pipe 8 is connected to the high-pressure side of the steam turbine 3 (high-pressure turbine 3a). When a follow-up ability of the supply amount of steam via the steam control valve 5 is low in relation to change of a frequency of an electric power system or change of a load, the possibility cannot be denied that blackout or the like is brought about. Thus, as shown in FIG. 1, in the steam turbine power generating system 1, the bypass pipe 9 and the steam overload valve 7 are installed in consideration of an operation at a time of overload of the steam turbine 3.

However, as shown in FIG. 1, compared with a case where steam is supplied from the main steam pipe 8 to the high-pressure side of the steam turbine 3 (high-pressure turbine 3a), supplying steam from the bypass pipe 9 to the lower-pressure side than a supply position by the main steam pipe 8 of the steam turbine 3 (high-pressure turbine 3a) means decrease of a workload performed by steam to the steam turbine 3 by an amount for a zone from a stage of the steam supply position by the main steam pipe 8 to a stage of a steam supply position by the bypass pipe 9. Therefore, in order to operate the steam turbine 3 efficiently, it is important to control an action of the steam overload valve 7 on the bypass pipe 9 properly.

Thus, as shown in FIG. 2, the steam turbine control device 11 of the present embodiment is further provided with the above-described valve control adjustment unit 30. The valve control adjustment unit 30 adds adjustment to control of the opening degree of the steam overload valve 7 by the valve control unit 27 which has the function generator 27a. More specifically, the valve control adjustment unit 30 adjusts a value of the flow rate instruction signal A accepted by the function generator 27a, in response to an input operation from the outside.

Figure 4:
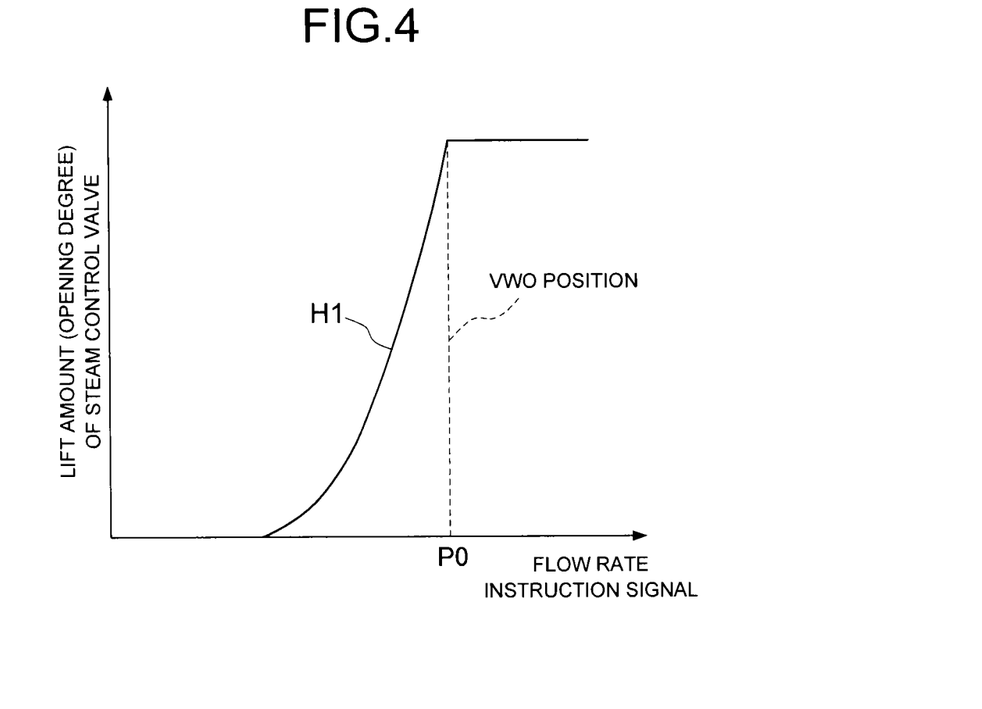
FIG. 4 is a graph showing a relation between a flow rate instruction signal and an opening degree of the steam valve.
Figure 5:
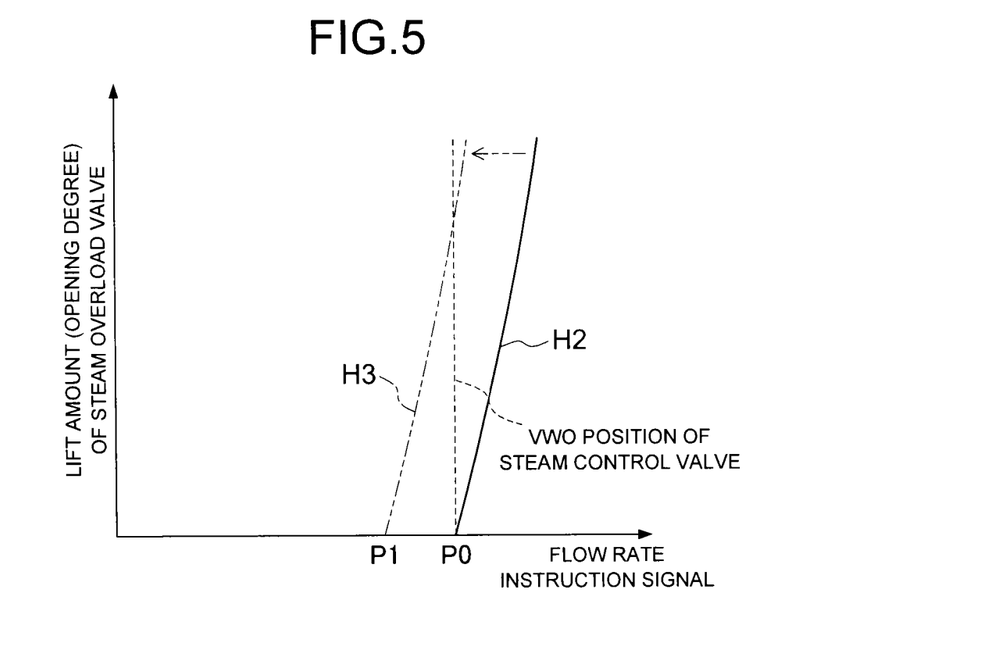
FIG. 5 is a graph showing a relation between the flow rate instruction signal and an opening degree of a steam overload valve.

Here, as shown in FIG. 4 and FIG. 5, in a case where adjustment of control of the opening degree by the valve control adjustment unit 30 is not carried out yet (at an initial setting), when control to fully open the steam control valve 5 (all the valves of the steam control valves $5a \ldots 5n$) is carried out by the function generators $25a \ldots 25n$ of the valve control unit 25 based on the flow rate instruction signal A (flow rate information), control to start to open the steam overload valve 7 by the function generator 27a of the valve control unit 27 is carried out.

FIG. 4 and FIG. 5 show that when the flow rate instruction signal A becomes a value P0, an opening degree (function) H1 of the steam control valve 5 becomes fully-opened (VWO), and that at this timing the steam overload valve 7 starts to open (an opening degree [function] H2 of the steam overload valve 7 starts to increase). In other words, the bypass pipe 9 in which flow of steam is controlled by the steam overload valve 7 is applied at the time of overload of the steam turbine 3 (electric power system).

In order to carry out the above-described control at the time of overload properly, the valve control adjustment unit 30 has, as shown in FIG. 2, an addition instruction unit 31, a subtraction instruction unit 32, an integrator 33, an amplifier 34, and an adder 35. The addition instruction unit 31 accepts an input operation, for example, by pressing of a predetermined operation button by an operator observing an operational status of the steam turbine 3 with a surveillance monitor or the like. The integrator 33 measures a period during which the operation button is continued to be pressed, for example, and increases a value of a signal to generate by an amount of the measured period. On the other hand, the subtraction instruction unit 32 accepts an input operation at a time that an operation button other than the above-described operation button is pressed.

The integrator 33 measures a period during which that another operation button is continued to be pressed, for example, and decreases a value of a signal to generate by an amount of the measured period. The amplifier 34 amplifies the signal outputted from the integrator 33 so that the signal reaches a level corresponding to a level of the flow rate instruction signal A. The adder 35 adds the signal amplified in the amplifier 34 as a bias signal, to the flow rate instruction signal A.

As shown in FIG. 4 and FIG. 5, by adding such a bias signal to the flow rate instruction signal A, it becomes possible to arbitrarily manipulate the timing at which the steam overload valve 7 starts to open (as shown in FIG. 5 as an opening degree [function] H3) relatively to the timing at which the opening degree H1 of the steam control valve 5 becomes fully-opened. In other words, in a case where adjustment of control of the opening degree by the valve control adjustment unit 30 is not carried out yet (at the initial setting), the steam overload valve 7 starts to open when the flow rate instruction signal A exceeds the value P0, as shown in FIG. 5. However, as a result that the above-described bias signal is added, the steam overload valve 7 starts to open when the flow rate instruction signal A exceeds a value P1 less than the value P0.

Thereby, at the time of overload of the steam turbine 3 (electric power system), the timing at which the steam overload valve 7 starts to open can be made earlier relatively to the timing at which the opening degree H1 of the steam control valve 5 becomes fully-opened. For example, as shown in FIG. 3, it is exemplified that adjustment is carried out so that the steam overload valve 7 starts to open at a timing when the opening degree of the steam control valve 5 becomes an opening degree corresponding to the point C.

Here, there will be described an adjustable range of the function H3 in FIG. 5 by the valve control adjustment unit 30 in response to the input operation. A range in which the function H3 can be shifted in a left side direction in FIG. 5 is properly set in consideration of an actual measured value of an operating characteristic when an actual machine of the steam turbine power generating system 1 which includes the steam turbine 3 shown in FIG. 1 is made to operate or aged deterioration of the actual machine. On the other hand, with regard to a range in which the function H3 can be shifted in a right side direction in FIG. 5, an adjustment range is restricted so that a position becomes the same as a position of the function H2. As a result that the adjustment range by the valve control adjustment unit 30 is set as above, it is avoided that the timing at which the steam overload valve 7 starts to open at the time of overload is delayed.

As already described, in the steam turbine control device 11 of the present embodiment, when the electric power system at the time of overload or the like is not stable, by adjusting to advance the timing to open the steam overload valve 7 by using the valve control adjustment unit 30, stability of the electric power system can be heightened. On the other hand, when the electric power system is stable, adjustment is done to delay the timing to open the steam overload valve 7 by the valve control adjustment unit 30, so that an operation of the steam turbine 3 while avoiding reduction of an operating efficiency as much as possible is performed. Therefore, according to the steam turbine control device 11, even at the time of overload, stability of the electric power system can be secured and an efficient operation of the steam turbine can be realized.

Second Embodiment

Next, a second embodiment will be described based on FIG. 6 and FIG. 7. Note that in FIG. 6, a component the same as the component in the first embodiment shown in FIG. 2 is granted the same reference numeral and redundant explanation will be omitted.

Figure 6:
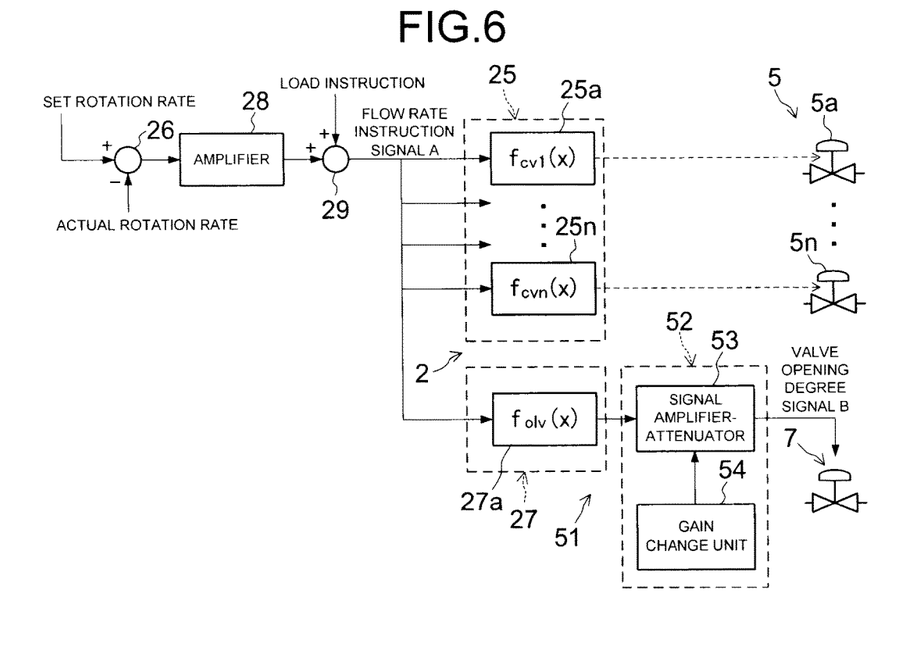
FIG. 6 is a functional block diagram showing a configuration of a steam turbine control device according to a second embodiment.

As shown in FIG. 6, a steam turbine control device 51 of the present embodiment has a valve control adjustment unit 52 instead of the valve control adjustment unit 30 of the first embodiment. The valve control adjustment unit 52 has a signal amplifier-attenuator (signal amplifying-attenuating unit) 53 and a gain change unit 54. The signal amplifier-attenuator 53 amplifies or attenuates a valve opening degree signal B outputted from a function generator 27a by a set gain. On the other hand, the gain change unit 54 has a function to change the gain set by the signal amplifier-attenuator 53 in response to an input operation from the outside by an operator or the like, for example.

Figure 7:
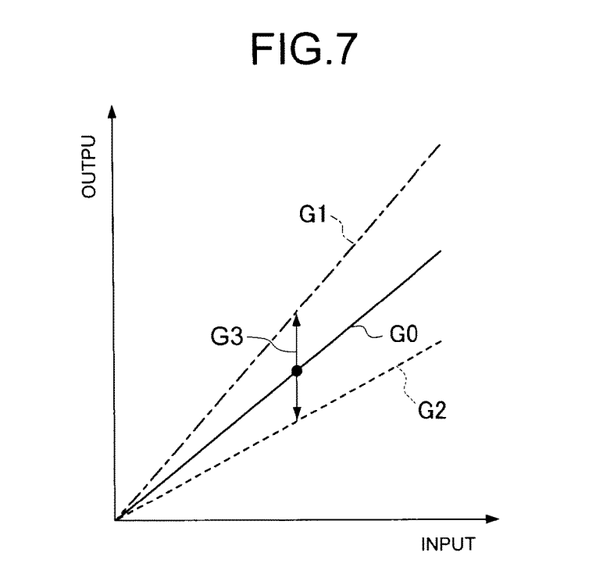
FIG. 7 is a graph for explaining gain adjustment of a valve opening degree signal to be transmitted to a steam overload valve side.

Here, FIG. 7 is graph exemplifying gain adjustment by the valve control adjustment unit 52 in relation to the valve opening degree signal B to be transmitted to a steam overload valve 7 side. A signal G0 in FIG. 7 is an original valve opening degree signal B which is not gain-adjusted. A signal G1 indicates a valve opening degree signal amplified by gain adjustment. A signal G2 indicates a valve opening degree signal attenuated by gain adjustment. A range G3 indicates a gain adjustment (change) range for amplifying or attenuating the valve opening degree signal B.

As described above, the steam turbine control device 51 of the present embodiment can adjust an amplification amount and an attenuation amount of the valve opening degree signal B (signal designating an opening degree of the steam overload valve 7) outputted as a function of a flow rate instruction signal A. Thereby, the steam turbine control device 51 can adjust a timing at which the steam overload valve 7 starts to open relatively to a timing at which a steam control valve 5 becomes fully-opened, as shown in FIG. 4 and FIG. 5.

Therefore, according to the steam turbine control device 51, it is possible to heighten stability of an electric power system even at a time of overload, and it is possible to make a steam turbine operate efficiently. Concretely, in the steam turbine control device 51, in an operation to which the steam overload valve 7 is applied, even when a load of the electric power system comes into an unstable state due to occurrence of overload hunting, for example, it is possible to cope with such a state by gain adjustment of the valve opening degree signal 13.

Third Embodiment

Next, a third embodiment will be described based on FIG. 8 and FIG. 9 in addition to aforementioned FIG. 1, FIG. 4, and FIG. 5. Note that in FIG. 8, a component the same as the component in the first embodiment shown in FIG. 2 is granted the same reference numeral and redundant explanation will be omitted.

Figure 8:
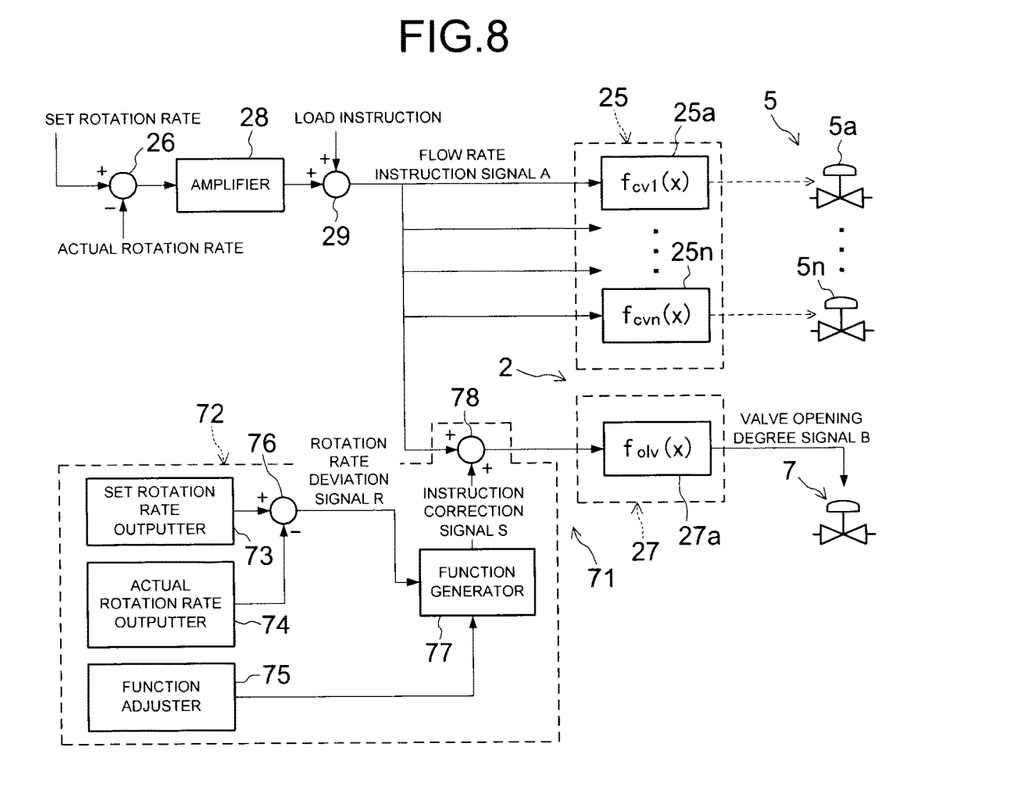
FIG. 8 s a functional block diagram showing a configuration of a steam turbine control device according to a third embodiment.

As shown in FIG. 8, a steam turbine control device 71 of the present embodiment has a valve control adjustment unit 72 instead of the valve control adjustment unit 30 of the first embodiment. The valve control adjustment unit 72 has a set rotation rate outputter 73, an actual rotation rate outputter 74, a subtracter 76, a function generator 77 as a second function generator, an adder 78 as a signal addition unit, and a function adjuster 75 as a function change unit.

The subtracter 76, as shown in FIG. 8, accepts two kinds of signals the same as the input signals to the subtracter 26 described in the first embodiment. In other words, the actual rotation rate outputter 74 outputs a present actual rotation rate (system frequency) per a unit time of a steam turbine 3 detected by a rotation rate detector 19 shown in FIG. 1, to the subtracter 76. The set rotation rate outputter 73 outputs a target set rotation rate (set frequency) set in advance in a steam turbine 3, to the subtracter 76. The subtracter 76 outputs a rotation rate deviation signal (frequency [rotation rate] deviation) R obtained by subtracting the actual rotation rate from the accepted set rotation rate to the function generator 77.

The function generator 77 accepts the above-described rotation rate deviation signal R indicating a value corresponding to a deviation between the actual rotation rate and the set rotation rate, as a variable. Further, the function generator 77 outputs, as a function of the rotation rate deviation signal R, an instruction correction signal S for practically correcting the value of the flow rate instruction signal A to the adder 78, as a bias signal. The adder 78 adds the instruction correction signal S outputted from the function generator 77 to the flow rate instruction signal A accepted by the function generator 27a of the valve control unit 27.

The function (functional formula) set in the function generator 77 is set in consideration of an actual measured value of an operating characteristic when an actual machine of the steam turbine power generating system 1 which includes the steam turbine 3 shown in FIG. 1 is made to operate, aged deterioration of the actual machine, or the like.

The steam turbine control device 71 of the present embodiment, as shown in FIG. 8, adds the instruction correction signal S being the function of the rotation rate deviation signal R to the flow rate instruction signal A. Thereby, the steam turbine control device 71, as shown in FIG. 4 and FIG. 5, becomes able to carry out what is called self-adjustment of a relative timing at which a steam overload valve 7 starts to open (as indicated as an opening degree [function] H3 in FIG. 5), in relation to a timing at which an opening degree H1 of a steam control valve 5 becomes fully-opened.

In other words, in a state where the instruction correction signal S is not added, the steam overload valve 7 starts to open when the flow rate instruction signal A exceeds a value P0, as shown in FIG. 5. However, as a result that the above-described instruction correction signal S is added, the steam overload valve 7 starts to open when the flow rate instruction signal A exceeds a value P1 less than the value P0. Thereby, at the time of overload of the steam turbine 3 (electric power system), it becomes possible to advance a timing at which the steam overload valve 7 starts to open relatively to a timing at which the opening degree H1 of the steam control valve 5 becomes fully-opened.

Figure 9:
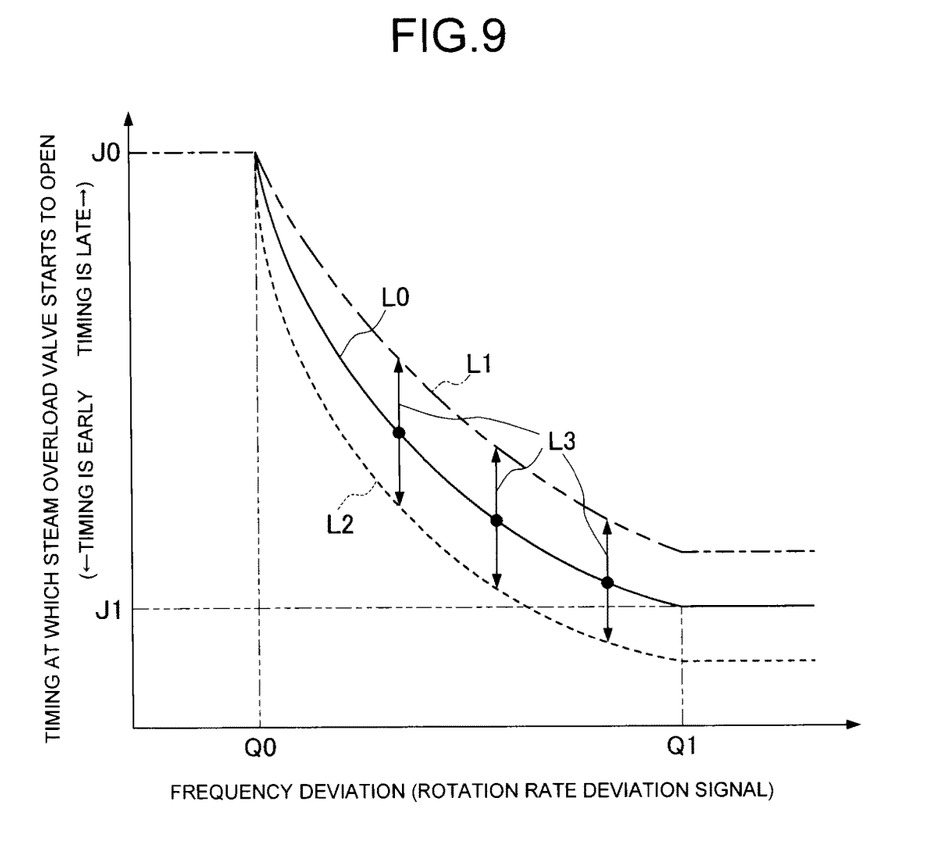
FIG. 9 is a graph showing a relation between a rotation rate deviation of the steam turbine and a timing at which a steam overload valve starts to open.

FIG. 9 is a graph showing a relation between the timing at which the steam overload valve 7 starts to open in relation to the timing at which the steam control valve 5 becomes fully-opened and the rotation rate deviation signal R of the steam turbine 3. Points J0, J1 in FIG. 9 are in a relation corresponding to the points P0, P1 in FIG. 5, respectively. Further, a characteristic L0 in FIG. 9 indicates a correspondence between a timing of the above-described start of opening and the rotation rate deviation signal R in a case where an initial function (functional formula) set in the function generator 77 in advance is applied.

In detail, the steam turbine control device 71 which has the valve control adjustment unit 72 carries out control to advance the timing at which the steam overload valve 7 starts to open as the value of the rotation rate deviation signal R increases (as an actual rotation rate decreases in relation to a set rotation rate) in a range in which the rotation rate deviation signal R is over a value Q0 and less than a value Q1, as shown in FIG. 9. Here, in the function generator 77, in consideration of the value of the rotation rate deviation signal R which may be outputted in a state where the electric power system is relatively stable, as shown in FIG. 9, a functional formula to output an instruction correction signal S of a value of "0" is set so as not to advance the timing at which the steam overload valve 7 starts to open, when the value of the rotation rate deviation signal R is the value Q0 or less.

Further, in the function generator 77, in order to suppress reduction of an operation efficiency of the steam turbine 3 due to usage of the bypass pipe 9 as much as possible, a functional formula to output an instruction correction signal S of a constant value is set so as not to further advance the timing at which the steam overload valve 7 starts to open, in a case where the value of the rotation rate deviation signal R is the value Q1 or more.

The function adjuster 75 has a function to change (adjust) a correspondence (functional formula) between the rotation rate deviation signal R as a variable in the function generator 77 and the instruction correction signal S being the function, in response to an input operation from the outside by an operator or the like, for example. Here, in FIG. 9, a characteristic L1 is an example in which the functional formula is changed so as to delay the timing at which the steam overload valve 7 starts to open. On the other hand, a characteristic L2 is an example in which the functional formula is changed so as to advance the timing at which the steam overload valve 7 starts to open. A range L3 indicates an adjustment (change) range of the timing to start to open. As a result of having such a function adjuster 75, it is possible to add correction to a content adjusted by the valve control adjustment unit 72 in concert with a present operating characteristic of the steam turbine power generating system 1 which includes the steam turbine 3 shown in FIG. 1.

As described above, according to the steam turbine control device 71 of the present embodiment, it is possible to make the steam turbine operate efficiently while securing stability to frequency change of the electric power system even at the time of overload.

Fourth Embodiment

Next, a fourth embodiment will be described based on FIG. 10 and FIG. 11 in addition to aforementioned FIG. 1, FIG. 4, FIG. 5, and FIG. 8. Note that in FIG. 10 a component the same as the component in the third embodiment shown in FIG. 8 is granted the same reference numeral and redundant explanation will be omitted.

Figure 10:
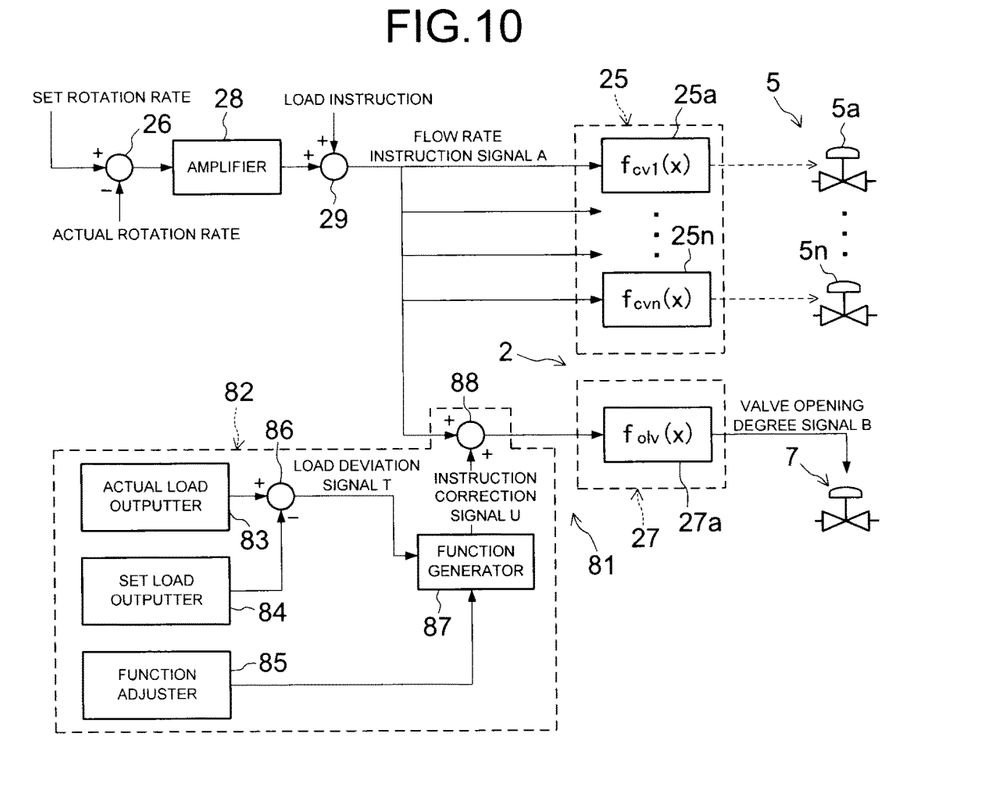
FIG. 10 is a functional block diagram showing a configuration of a steam turbine control device according to a fourth embodiment.

As shown in FIG. 10, a steam turbine control device 81 of the present embodiment has a valve control adjustment unit 82 instead of the valve control adjustment unit 72 of the third embodiment shown in FIG. 8. The valve control adjustment unit 82 has an actual load outputter 83, a set load outputter 84, a subtracter 86, a function generator 87 as a third function generator, an adder 88 being a second signal addition unit, and a function adjuster 85 as a second function change unit.

The actual load outputter 83 outputs to the subtracter 86 a present actual load (actual load signal indicating a value corresponding to an actual load) of a steam turbine 3 which is in a proportionality relation with a present current value flowing in a power generator 18 detected by a current detector 20 shown in FIG. 1. On the other hand, the set load outputter 84 outputs to the subtracter 86 a target set load (load instruction signal indicating a value corresponding to a target set load) of a steam turbine 3 which is set (planned) in correspondence with a demand of electric power. The subtracter 86 outputs to the function generator 87 a load deviation signal T obtained by subtracting the target set load from the accepted present actual load.

The function generator 87 accepts the above-described load deviation signal T indicating a value corresponding to a deviation between the above-described present actual load and the set load as a variable. Further, the function generator 87 outputs to the adder 88 an instruction correction signal (second instruction correction signal) U for practically correcting a value of a flow rate instruction signal A, as a function of the load deviation signal T. The adder 88 adds the instruction correction signal U outputted from the function generator 87 to the flow rate instruction signal A accepted by a function generator 27a of a valve control unit 27.

A function (functional formula) set in the function generator 87 is set in consideration of an actual measured value of an operating characteristic when an actual machine of the steam turbine power generating system 1 shown in FIG. 1 is made to operate or aged deterioration of the actual machine, similarly to in the function generator 77 of the third embodiment. The steam turbine control device 81 adds the instruction correction signal U being the function of the load deviation signal T to the flow rate instruction signal A, as shown in FIG. 10. Therefore, the steam turbine control device 81, as shown in FIG. 4 and FIG. 5, becomes able to self-adjust a relative timing at which a steam overload valve 7 starts to open (as indicated by a function H3 in FIG. 5), in relation to a timing at which an opening degree H1 of a steam control valve 5 becomes fully-opened.

Figure 11:
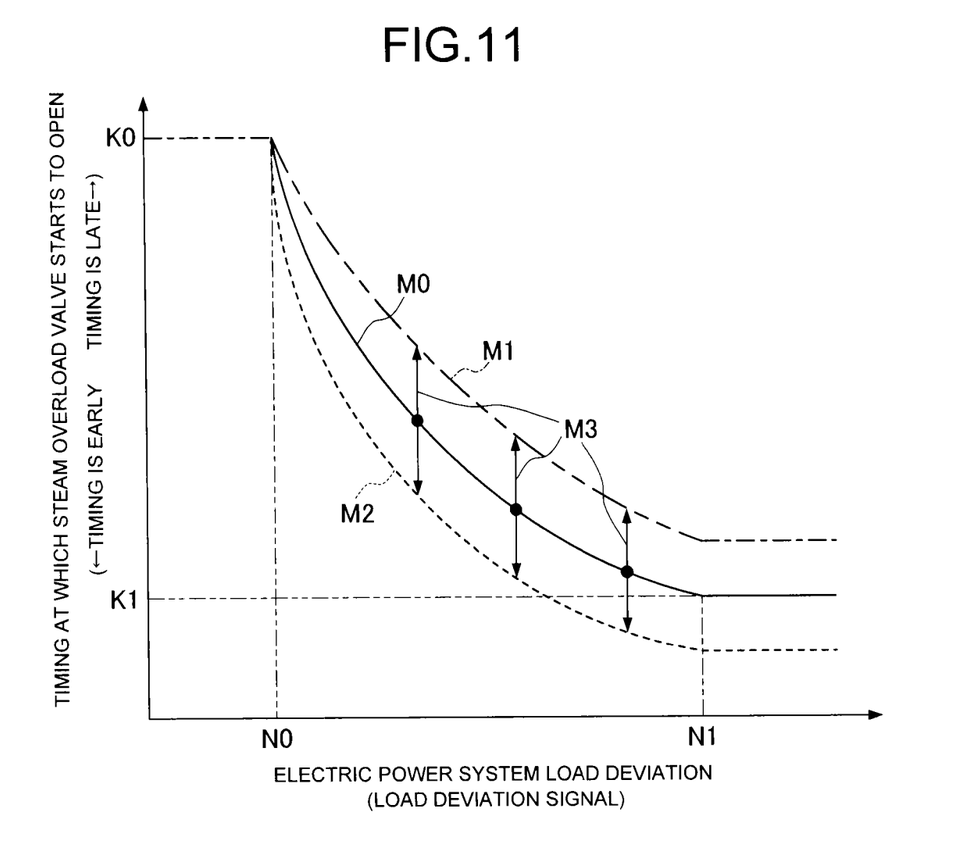
FIG. 11 is a graph showing a relation between an electric power system load deviation of a steam turbine and a timing at which a steam overload valve starts to open.

FIG. 11 is a graph showing a relation between the timing at which the steam overload valve 7 starts to open in relation to the timing at which the steam control valve 5 becomes fully-opened and the load deviation signal T of the steam turbine 3. Points K0, K1 in FIG. 11 are in a relation corresponding to the points P0, P1 in FIG. 5, respectively. Further, a characteristic M0 in FIG. 11 indicates a correspondence between the timing of the above-described start of opening and the load deviation signal T in a case where an initial function (functional formula) set in the function generator 87 in advance is applied.

In detail, the steam turbine control device 81 which has the valve control adjustment unit 82 carries out control to advance the timing at which the steam overload valve 7 starts to open as a value of the load deviation signal T increases (as the actual load becomes large in relation to the set load [load instruction]) within a range in which the load deviation signal T is over a value N0 and is less than a value N1, as shown in FIG. 11.

Here, in the function generator 87, in consideration of the value of the load deviation signal T which may be outputted in a state where an electric power system is relatively stable, as shown in FIG. 11, a functional formula to output an instruction correction signal U of a value "0" is set so as not to advance the timing at which the steam overload valve 7 starts to open, when the value of the load deviation signal T is the value N0 or less. Further, in the function generator 87, in order to suppress reduction of an operation efficiency of the steam turbine 3 as much as possible, a functional formula to output an instruction correction signal U of a constant value is set so as not to further advance the timing at which the steam overload valve 7 starts to open, in a case where the value of the load deviation signal T is the value N1 or more.

The function adjuster 85 has a function to change (adjust) a correspondence (functional formula) between the load deviation signal T as a variable in the function generator 87 and the instruction correction signal U being the function in response to an input operation from the outside by an operator or the like, for example. Here, in FIG. 11, a characteristic M1 is an example in which the functional formula is changed so as to delay the timing at which the steam overload valve 7 starts to open. On the other hand, a characteristic M2 is an example in which the functional formula is changed so as to advance the timing at which the steam overload valve 7 starts to open. A range M3 indicates an adjustment (change) range of the timing to start to open. As a result of having such a function adjuster 85, it is possible to add correction to a content adjusted by the valve control adjustment unit 82 in concert with a present operating characteristic of the steam turbine power generating system 1 shown in FIG. 1.

As described above, according to the steam turbine control device 81 of the present embodiment, stability to load change of an electric power system can be secured and an efficient operation of the steam turbine can be realized, at the time of overload or the like.

Hereinabove, while certain embodiments have been described, these embodiments have been presented by way of example only, and are not intended to limit the scope of the inventions. Indeed, the novel embodiment described herein may be embodiment in a variety of other forms; furthermore, substitutions and changes in the form of the embodiments described herein may be made without departing from the spirit of the inventions. The accompanying claims and their equivalents are intended to cover such forms or modifications as would fall within the scope and spirit of the inventions.

For example, it is possible to constitute a steam turbine control device which has both the valve control adjustment unit 30 shown in FIG. 2 and the valve control adjustment unit 52 shown in FIG. 6. Further, it is also possible to constitute a steam turbine control device which has both the valve control adjustment unit 72 shown in FIG. 8 (or the valve control adjustment unit 82 shown in FIG. 10) and the valve control adjustment unit 52 shown in FIG. 6.

Further, in the first to fourth embodiments, there are exemplified configurations in which the main steam pipe 8 branches into four in a part where the main steam pipe 8 is connected to the steam turbine 3 (high-pressure turbine 3a) and the four steam control valves are provided to the branching four pipes. Instead of such a configuration, for example, a structure in which a main steam pipe branches into two are possible, and a configuration in which one main steam pipe does not branch and is connected to a steam turbine is also possible. In a case of the above configurations, it is a matter of course that two or single steam control valve(s) are (is) disposed, respectively, in order to control the main steam flow rate.

Figure 12:
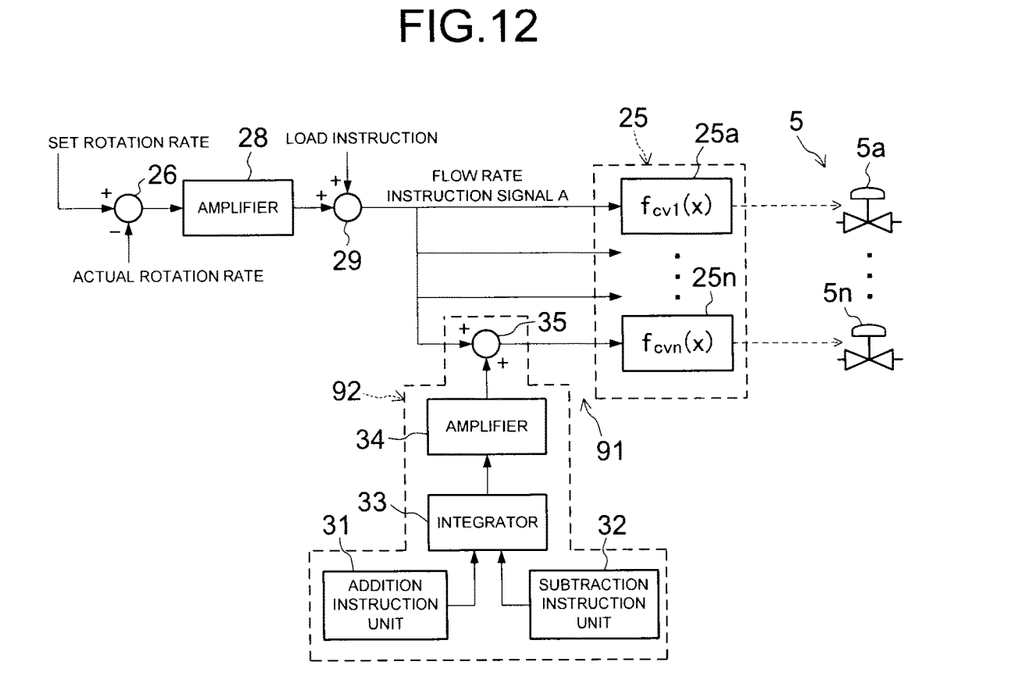
FIG. 12 is a functional block diagram showing a configuration of another steam turbine control device.

Further, for example, to a steam turbine power generating system which does not have a bypass pipe or a steam overload valve, it is also possible to apply a steam turbine control device 91 capable of adding adjustment to control of an opening degree of a steam control valve 5 by a valve control unit 25, as shown in FIG. 12. The steam turbine control device 91 is provided with a valve control adjustment unit 92 having a configuration the same as that of the valve control adjustment unit 30 shown in FIG. 2. The valve control adjustment unit 92 (an adder 35 thereof) is disposed in a previous stage of a function generator 25n which accepts a flow rate instruction signal A. Further, the valve control adjustment unit 92 can be disposed in previous stages of all the function generators 25a . . . 25n. In the steam turbine control device 91 of such a configuration, it is possible to add adjustment to control of an opening degree of a steam control valve 5 via an input operation of an operator observing an operational status of a steam turbine, for example.

What is claimed is:

1. A steam turbine control device, comprising:
   a first valve provided in a first steam supply path connected to a steam turbine;
   a second valve provided in a second steam supply path connected to a lower-pressure side of the steam turbine than the first steam supply path while bypassing the first valve from on the first steam supply path;
   a first valve control unit configured to control an opening degree of the first valve based on flow rate information designating a flow rate of steam to be sent to the steam turbine;
   a second valve control unit configured to control an opening degree of the second valve based on the flow rate information; and
   a valve control adjustment unit configured to add adjustment to control of the opening degree of the second valve by the second valve control unit.

2. The steam turbine control device according to claim 1, wherein the second valve control unit comprises a first function generator which accepts a flow rate instruction signal being a variable indicating a value corresponding to the designated flow rate of steam as the flow rate information and outputs, to a valve side of the second valve, a valve opening degree signal indicating a value corresponding to the opening degree of the second valve as a function of the flow rate instruction signal,
   wherein the valve control adjustment unit adjusts the value of the flow rate instruction signal accepted by the first function generator in response to an input operation from the outside.

3. The steam turbine control device according to claim 1, wherein the second valve control unit comprises a first function generator which accepts a flow rate instruction signal being a variable indicating a value corresponding to the designated flow rate of steam as the flow rate information and outputs, to a valve side of the second valve, a valve opening degree signal indicating a value corresponding to the opening degree of the second valve as a function of the flow rate instruction signal,
   wherein the valve control adjustment unit comprises:
      a signal amplifier-attenuator configured to amplify or attenuate the valve opening degree signal outputted from the first function generator at a set gain; and
      a gain change unit configured to change the gain set in the signal amplifier-attenuator in response to an input operation from the outside.

4. The steam turbine control device according to claim 1, wherein the second valve control unit comprises a first function generator which accepts the flow rate information as a flow rate instruction signal being a variable indicating a value corresponding to the designated flow rate of steam and outputs, to a valve side of the second valve, a valve opening degree signal indicating a value corresponding to the opening degree of the second valve as a function of the flow rate instruction signal,
   wherein the valve control adjustment unit comprises:
      a second function generator configured to accept a rotation rate deviation signal indicating a value corresponding to a deviation between a present rotation rate and a set target rotation rate of the steam turbine as a variable and to output an instruction correction signal for correcting a value of the flow rate instruction signal as a function of the rotation rate deviation signal;
      a signal adder configured to add the instruction correction signal outputted from the second function generator to the flow rate instruction signal accepted by the first function generator; and
      a function change unit configured to change a correspondence between the variable and the function in the second function generator in response to an input operation from the outside.

5. The steam turbine control device according to claim 1, wherein the second valve control unit comprises a first function generator which accepts the flow rate information as a flow rate instruction signal being a variable indicating a value corresponding to the designated flow rate of steam and outputs, to a valve side of the second valve, a valve opening degree signal indicating a value corresponding to the opening degree of the second valve as a function of the flow rate instruction signal,
   wherein the valve control adjustment unit comprises:
      a third function generator configured to accept a load deviation signal indicating a value corresponding to a deviation between a present load and a set target load of the steam turbine as a variable and to output a second instruction correction signal for correcting a value of the flow rate instruction signal as a function of the load deviation signal; and
      a second signal adder configured to add the second instruction correction signal outputted from the third function generator to the flow rate instruction signal accepted by the first function generator.

6. The steam turbine control device according to claim 5, wherein the valve control adjustment unit further comprises a second function change unit configured to change a correspondence between the variable and the function in the third function generator in response to an input operation from the outside.

7. The steam turbine control device according to claim 1, wherein, in a case where adjustment of control of the opening degree by the valve control adjustment unit is not carried out yet, when control to fully open the first valve is carried out by the first valve control unit based on the flow rate information, control to start to open the second valve by the second valve control unit is carried out.

* * * * *